United States Patent Office 2,847,459
Patented Aug. 12, 1958

2,847,459

PREPARATION OF AROMATIC SULFONATE SALTS

Joseph Edward Mitchell, East Rutherford, N. J., assignor to Colgate-Palmolive Company, Jersey City, N. J., a corporation of Delaware No Drawing. Application April 29, 1955
Serial No. 505,043

5 Claims. (Cl. 260—505)

The present invention relates to the preparation of aromatic sulfonate water soluble salts of substantially stable pH.

It has previously been proposed to prepare aromatic sulfonate water soluble salts by reacting aromatic hydrocarbons with a sulfonating agent, and then neutralizing the thus produced aromatic sulfonic acid with a base which provides a water soluble salt-forming cation, e. g. sodium hydroxide. Normally this procedure is quite satisfactory, however when anhydrous sulfur trioxide is employed as the sulfonating agent it has been found that the freshly neutralized product is unstable with reference to pH, i. e. it tends to drift towards the acid side. This drift occurs relatively slowly, taking several days in some cases, necessitating frequent additions of base and/or a lengthy aging period before such products are sufficiently stable for further use.

In accordance with the present invention, a process for the preparation of aromatic sulfonate water soluble salts of substantially stable pH comprises reacting a sulfonatable aromatic compound with anhydrous sulfur trioxide, treating the resulting product in an aqueous medium with salt-forming base capable of forming water soluble sulfonate salts, and aging the thus produced material at an elevated temperature for a period of time sufficient to produce an aromatic sulfonate water soluble salt of substantially stable pH.

A preferred embodiment of the present invention comprises reacting a higher alkyl substituted aromatic compound with anhydrous sulfur trioxide, neutralizing the resulting sulfonation product in an aqueous medium with an alkali metal hydroxide or carbonate, and aging the thus produced material at a pH above about 7 and a temperature from about 65° C. to about 100° C. for a period of time from about ¼ to about 2½ hours sufficient to produce an alkyl aryl sulfonate salt of substantially stable pH.

In carrying out the present invention it is essential that the aging of the neutralized material be carried out in an aqueous medium. Normally water will comprise about 20% to about 80% by weight of the mixture being aged.

The anhydrous sulfur trioxide employed may be in gaseous, liquid or solid form, however it is preferred to employ the gamma form, a normally liquid modification of sulfur trioxide containing a large proportion of monomeric sulfur trioxide and melting at about 17° C. This material is commercially available in a stabilized form containing an inhibitor which maintains the sulfur trioxide in liquid condition at temperatures above its melting point.

The aromatic hydrocarbon which is employed in the process of the present invention comprises sulfonatable aromatic and alkyl aromatic compounds broadly. Thus there may be employed mononuclear (e. g. benzene and toluene) or polynuclear (e. g. naphthalene, anthracene, biphenyl, etc.) organic compounds containing sulfonatable aromatic constituents. More particularly it is preferred to employ the higher alkyl aryl hydrocarbons having an alkyl substituent containing about 10 to 18 carbon atoms, for example those alkyl aryl hydrocarbons derived from benzene, toluene, and naphthalene. The alkyl substituent may be straight or branched chain in structure and comprises such groups as decyl, dodecyl, keryl, pentadecyl, mixed long-chain alkyls derived from kerosene, fatty materials and polymers of lower olefines, cracked paraffin wax olefines, and the like. Preferred examples of this class are the higher alkyl benzenes wherein the alkyl group is about 12 to 15 carbon atoms, e. g. tetrapropylene- or pentapropylene-benzene.

The water soluble sulfonate salt-forming bases of the present invention are well known to the art and include the alkali metal (e. g. sodium, potassium and lithium) and alkali earth metal (e. g. calcium and magnesium) oxides, hydroxides and carbonates, and ammonia and organic amine bases. The amount of said base to be employed is sufficient to neutralize the sulfonated hydrocarbon to a substantially neutral or slightly alkaline condition (pH about 5 to 13). Since corrosion of metallic equipment and resultant discoloration of the sulfonate salts tend to occur when the aqueous neutralized material is aged in metallic equipment at an acidic pH, it is generally preferred to treat the sulfonation product with sufficient base to produce a material of initial pH of at least about 8, and usually about 12 to 13 higher, and to maintain a pH of above about 7 during aging by the addition of base to the slurry as required.

The aging period employed in carrying out the instant novel process is at least equal to that period of time required to produce an aqueous sulfonate salt mixture of substantially stable pH. During this minimum aging period the pH of the aqueous mixture rapidly diminishes to a substantially stable value. Normally, at the specified aging temperatures, a minimum period of about ¼ to 2½ hours is adequate to achieve the desired result, although in some cases minimum periods as short as 5 to 10 minutes or as long as 3 hours and longer may be suitable. As the necessary minimum period of time is apparently affected by factors not fully understood at the present, it is frequently convenient to establish the required period by routine experiments carried out on a small batch of material. In general, an aging period may be considered to be of sufficient length, when on further aging for at least one hour at a suitably elevated temperature, a negligible drift in pH occurs (e. g. of less than about 0.25 unit). Excessive aging beyond the designated minimum period serves no practical beneficial purpose and may bring about decomposition and discoloration of the product.

The following examples are given to additionally illustrate the nature of the invention and it will be understood that the invention is not limited thereto. (All parts are by weight unless otherwise specified.)

EXAMPLE I

Dodecyl benzene is sulfonated using a 5% molar excess of sulfur trioxide (dispersed in air) at a temperature of 20 to 50° C. The reaction time is 40 to 45 minutes. 135 parts of the acid mix so produced are neutralized by addition thereof to 100 parts of a mixture of ice and water and 35 parts of 50° Bé. caustic soda. 50 parts of water are mixed with the neutralized mixture, and the resulting slurry is aged at 75 to 80° C. on a steam bath. The initial pH of the slurry is 12.5.

The aging characteristics of the slurry are shown by Table I below.

Table I

| Aging time minutes: | pH |
|---|---|
| 0 | 12.5. |
| 25 | 3.8 (adjusted to 9.0 with caustic). |
| 30 | 4.5 (adjusted to 9.0 with caustic). |
| 120 | 4.5 (adjusted to 12.5 with caustic). |
| 150 | 12.5. |

A negligible change in pH occurs after the initial 150-minute aging period, i. e. a decrease of 0.2 pH units occurs on aging at 75° C. for an additional 2½ hours.

A second slurry prepared from the above acid mix by neutralization with excess 10% caustic is aged at 20° to 30° C. for comparison purposes. The slurry slowly drifts downward in pH over the course of 2 days. The pH of the slurry finally becomes stable after the slurry is held at room temperature for a total of 68 hours and at 50° C. for 4 hours.

EXAMPLE II

Dodecyl benzene is sulfonated with a 1% molar excess of sulfur trioxide dispersed in air. The reaction time is 40 to 45 minutes, and the reaction is carried out at the temperature within the range of 15 to 53° C.

386 parts of the thus produced acid mix are added to a vessel containing 300 parts of ice and 100 parts of 50° Bé. caustic soda. The temperature during the mixing is a maximum of 25° C. The pH of the neutralized slurry is 8.5.

A portion of the slurry is aged at 75 to 80° C. and a second portion is aged at 95 to 100° C. Both portions become stable in pH within 15 minutes.

EXAMPLE III

A higher alkyl benzene in which the alkyl group contains about 12 carbon atoms, is sulfonated by passing a stream of sulfur trioxide gas diluted with air into a receiver containing the alkyl benzene. The addition is carried out over a 20 minute period at temperatures within the range of about −20° C. to about +5° C., the molar proportion of sulfur trioxide to alkyl benzene being approximately 1.15 to 1. After the reaction is complete, the reaction mix is raised in temperature to 25° C. to diminish its viscosity. It is then poured into a mixture of ice and water and neutralized with 20% caustic soda to a pH of 13.0. The slurry is well mixed and then is stabilized by being held at 80° C. on a steam bath for 2¼ hours. The pH is then 12.3. Sulfuric acid is employed to adjust the pH to 9.9, and the slurry is stirred at 40° C. for 3 hours (to check its stability). As only a slight drop in pH occurs during this period (0.3 unit), the pH of the slurry is adjusted to 8.5 by the addition of further acid and the product is dried in preparation for further use.

While there has been disclosed and described what is at present considered to be the preferred embodiment of the invention it will be understood, of course, that many changes, modifications, and substitutions may be made therein without departing from the true scope of the invention as defined in the appended claims.

What is claimed is:

1. A process for the preparation of higher alkyl aryl sulfonate water soluble salts of substantially stable pH comprising reacting a higher alkyl substituted aromatic compound with anhydrous sulfur trioxide, neutralizing the resulting product in an aqueous medium with a salt-forming base capable of forming water soluble sulfonate salts, and aging the thus neutralized material at a temperature from about 65° C. to about 100° C. for a period of time from about ¼ to about 2½ hours sufficient to produce an alkyl aryl sulfonate salt of substantially stable pH.

2. A process for the preparation of higher alkyl aryl sulfonate water soluble salts of substantially stable pH as set forth in claim 1 wherein said alkyl substituent contains about 10 to 18 carbon atoms.

3. A process for the preparation of higher alkyl aryl sulfonate water soluble salts of substantially stable pH as set forth in claim 1 wherein the pH of said neutralized material is within the range of about 5 to 13.

4. A process for the preparation of higher alkyl aryl sulfonate water soluble salts of substantially stable pH as set forth in claim 1 wherein the pH of said neutralized material is maintained above about 7 during aging.

5. A process for the preparation of higher alkyl aryl sulfonate water-soluble salts of substantially stable pH comprising reacting a higher alkyl substituted aromatic compound with anhydrous sulfur trioxide, neutralizing the resulting product in an aqueous medium with a salt-forming base capable of forming water-soluble sulfonate salts, and aging the thus neutralized material at a temperature from about 65° C. to about 100° C. for a period of time of at least 5 minutes and sufficient to produce a higher alkyl aryl sulfonate water-soluble salt of substantially stable pH.

References Cited in the file of this patent

UNITED STATES PATENTS

| 2,130,326 | Thurston | Sept. 13, 1938 |
| 2,480,592 | Mitchell | Aug. 30, 1949 |
| 2,567,854 | Nixon | Sept. 11, 1951 |
| 2,768,199 | Luntz et al. | Oct. 23, 1956 |

FOREIGN PATENTS

| 149,577 | Australia | Jan. 6, 1953 |

OTHER REFERENCES

Bramston-Cook et al.: Ind. Eng. Chem., vol. 46: 1929 (1954).